United States Patent [19]

Kocot

[11] Patent Number: 4,471,364

[45] Date of Patent: Sep. 11, 1984

[54] RAMP STYLE CONSTANT HEAD INK JET CARTRIDGE

[75] Inventor: Raymond H. Kocot, Danbury, Conn.

[73] Assignee: Burroughs Corporation, Detroit, Mich.

[21] Appl. No.: 425,233

[22] Filed: Sep. 28, 1982

[51] Int. Cl.[3] .............................................. G01D 15/16

[52] U.S. Cl. ................................................ 346/140 R

[58] Field of Search .................. 346/140 R, 140 A, 75

[56] References Cited

U.S. PATENT DOCUMENTS

| | | | |
|---|---|---|---|
| 4,282,536 | 8/1981 | Paschen | 346/140 |
| 4,319,254 | 3/1982 | Hurkmans | 346/140 |
| 4,404,573 | 9/1983 | Kocot | 346/140 |

*Primary Examiner*—Joseph W. Hartary
*Attorney, Agent, or Firm*—Mark T. Starr; Edmund M. Chung; K. R. Peterson

[57] ABSTRACT

A replaceable cartridge for use in an electrostatic ink jet printer includes not only a sealed ink supply, but the ink jet itself. The cartridge forms part of a printer head which is mounted to move transversely back and forth across the width of a recording paper.

The cartridge includes an ink reservoir which is divided into two compartments by a ramp-shaped structure, one end of the first compartment formed by the perpendicular end of the ramp, the ink jet mounted to a wall of the first compartment. The head's transverse movement serves to shift ink from the second compartment up the ramp and into the first compartment where it is trapped by the perpendicular end of the ramp. As a result, the ink supply to the jet is maintained at a constant optimum level as ink is dispensed from the jet.

The cartridge additionally includes a venting mechanism which allows air to replace ink which has been dispensed from the jet.

20 Claims, 3 Drawing Figures

RAMP STYLE CONSTANT HEAD INK JET CARTRIDGE

CROSS-REFERENCE TO RELATED APPLICATIONS

Reference is made to a copending application entitled "Ink Jet Cartridge With Hydrostatic Controller", Ser. No. 425,232 filed concurrently with the present application by the same inventor, said application being assigned to the same assignee as the present application. That application discloses a float controlled ink jet cartridge which also provides constant hydrostatic pressure to an ink jet nozzle.

Reference is also made to U.S. Pat. No. 4,404,573 for "an Electrostatic Ink Jet System", issued Sept. 13, 1983 and assigned to the same assignee as the present application. That application is incorporated herein to show the operation of an electrostatic ink jet printing system such as that utilized in the present invention.

BACKGROUND OF THE INVENTION

1. Field of Invention

The present invention relates in general to the field of electrostatic ink jet printers. More particularly, the present invention relates to a disposable ink jet cartridge which forms part of a printer head which is mounted to move transversely back and forth across the width of a recording paper. Still more particularly, the present invention relates to an ink jet printer in which a replaceable cartridge contains not only the ink supply but also the ink jet itself.

2. Prior Art

Prior Art electrostatic ink jet printing systems include an ink jet nozzle, a supply of conductive ink, a metallized surface upon which recording paper is placed, and a high voltage supply connected between the conductive ink and the metallized surface. Upon application of the voltage differential, the ink is drawn from the ink jet nozzle toward the metallized surface. Since the paper is interposed between the ink jet nozzle and the metallized surface, the ink is deposited on the paper so long as the voltage is applied. Thus either the paper, the ink jet nozzle, or both have to be moved in order to print any comprehensive information.

Many problems exist in prior art electrostatic ink jet printing systems. For example, since the reservoir containing the ink supply has to be periodically refilled, the reservoir must include an opening means for adding additional ink. Oftentimes, during refilling, outside contaminents enter the opening along with the ink. Also, the container for storing the refill supply of ink may include dried ink residue which can be introduced to the system when the reservoir is refilled. The introduction of such contaminents to the ink supply reservoir often results in clogging of the ink jet nozzle. Further, the task of refilling the ink reservoir is a messy job.

Prior art systems exhibit additional problems due to variations in the level of ink in the supply reservoir. These variations cause changes in the ink head pressure to the jet nozzle and result in variations in the density and quality of the printing produced.

OBJECTS

It is the general object of the present invention to overcome many of the above mentioned drawbacks of the prior art by providing a disposable ink jet cartridge which contains therein not only an ink supply, but also the jet nozzle itself.

It is another object of the present invention to provide such a cartridge whose internal head pressure at the jet nozzle is maintained at a constant level.

It is still another object of the present invention to provide an ink cartridge which includes means for transferring an enclosed ink supply from one compartment over a ramp structure into another compartment to thereby maintain a constant head pressure in the other compartment.

It is an additional object of the present invention to provide an ink jet cartridge whose ink supply is sealed from contamination by external particulants.

It is still an additional object of the present invention to provide an ink jet cartridge which maintains constant hydrostatic pressure to an integral nozzle and which vents the ink supply to allow air to replace expended ink.

It is yet another object of the present invention to provide an ink jet cartridge which forms part of a printer head which is mounted to move transversely back and forth across the width of a recording paper.

It is a further object of the present invention to provide a multi-compartmentalized ink jet cartridge including an integral elctrostatic on-demand ink jet nozzle wherein a constant head pressure of ink is maintained in the compartment which supplies the jet nozzle with ink.

It is still a further object of the present invention to provide a disposable ink jet cartridge which includes an integral ink supply in which a major portion of the ink supply may be dispensed before it is necessary to replace the cartridge.

These and other objects of the present invention will become more apparent upon a studious consideration of the accompanying drawings in combination with a reading of the following detailed description of the preferred embodiments.

SUMMARY OF THE INVENTION

In accordance with the invention, a disposable ink jet cartridge forms part of the head of a printer mechanism. The head is mounted to move transversely back and forth across the width of a recording paper.

The cartridge includes a rectangular shaped reservoir which is divided into two compartments by a right triangular prism, the base of the prism in contact with the inside bottom of the reservoir. The face of the prism which is perpendicular with the base provides a vertical wall which serves as one end of the first compartment. The sloped surface of the prism connecting the perpendicular face and the base of the prism similarly serves as one end of the second compartment.

The first compartment supplies ink at a constant hydrostatic pressure to an on-demand ink jet nozzle which is mounted on the front wall of the first compartment, the dispensing tip of the nozzle facing the recording paper.

The second compartment contains an ink supply. As the head completes its travel in either direction, the ink in the second compartment flows up the sloped surface of the prism and into the first compartment. As the ink flows into the first compartment, it is trapped by the perpendicular prism wall, the height of the perpendicular prism wall corresponding to an ink head height which provides optimum hydrostatic pressure to the jet nozzle.

A cam is fixedly mounted on the printer mechanism in horizontal alignment with the path of the head as it moves in a first one of its directions of travel. As the cartridge moves across the paper in the first direction, an included second cam slidably engages the fixed cam, thereby activating a venting mechanism attached to the second cam. This venting action opens the reservoir to allow air to replace the ink which has been dispensed from the nozzle.

Also disclosed is an alternate embodiment in which the sloped surface of the prism is curved rather than being flat as in the primary embodiment.

DETAILED DESCRIPTION OF THE PREFERRED EMBODIMENT

Figure 1:
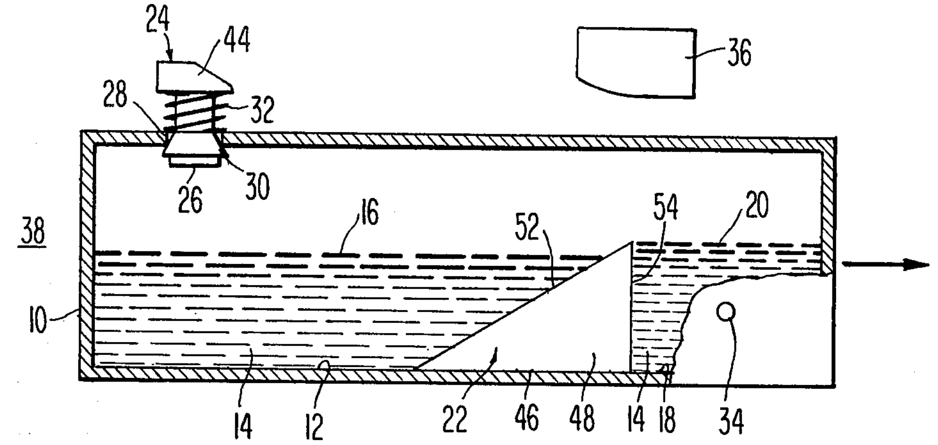
FIG. 1 is a front pictorial view of the disposable ink jet cartridge with a section cut away. Note that the external cam is fixedly mounted to a printer mechanism which is not shown.

Referring first to FIG. 1, shown is an ink reservoir 10 including a first portion 12 containing ink 14 at a first level 16 and a second portion 18 containing ink 14 at a second level 20, the first and second portions 12 and 18 separated by ramp member 22.

In the preferred embodiment, the ramp member 22 is a closed right triangular prism. The horizontal base 46 of the prism 22 is connected to the inside bottom of reservoir 10 as shown in FIG. 1. The distance between the prism's two parallel sides 48,50 is approximately equal to the distance between the front and back walls of reservoir 10 such that each of these parallel sides 48,50 is in contact with the front and back walls of the reservoir 10 respectively. A waterproof adhesive may be applied between the connected surfaces of the prism 22 and reservoir 10 to assure that ink 14 will not flow between the first and second portions 12, 18 unless the ink 14 flows over the inclined top surface 52 of the prism 22. The end 54 of the prism 22 is perpendicular with the prism's base 46 and therefore it is also perpendicular with the bottom of the reservoir 10.

In the preferred embodiment, the horizontal length of the base 46 of the prism 22 is longer than the height of the end 54 of the prism 22. The height of the end 54 of the prism 22 is chosen to provide optimum hydrostatic pressure to jet nozzle 34 when the head height of ink 14 in the second portion 18 is at a level equivalent to the height of the end 54 of the prism 22.

Although ramp member 22 is described as being a separate structure which is connected to the reservoir 10, those skilled in the art will appreciate that ramp member 22 may be formed as an integral part of the reservoir 10 itself using injection molding or similar techniques. In such case, ramp member 22 would not include a base 46 or sides 48,50. The fabrication of the reservoir 10 in this manner would serve to reduce manufacturing costs.

Mounted on the top surface of the reservoir 10 is venting mechanism 24. The venting mechanism 24 includes a bolt 26, the shaft of which passes through a hole 28 in the top of reservoir 10. Connected to the end of the bolt's (26) shaft is cam 44. Mounted on the shaft of bolt 26 in contact with the bolt's (26) head is washer 30. In the preferred embodiment, the washer 30 is made of a pliable plastic or rubber-like material so that it will create an air-tight seal when its surface contacts the edge surrounding hole 28. In the preferred embodiment, the washer 30 is held in position against the surface of the bolt's (26) head due to the friction between the outer surface of the bolt's (26) shaft and the inner surface of washer 30 which exists due to the hole through washer 30 being of smaller diameter than the diameter of the shaft. Alternatively, an adhesive (not shown) may be used to hold washer 30 in position against the head of bolt 26.

Surrounding the shaft of bolt 26 and positioned between the opposing surfaces of the cam 44 and the top of reservoir 10 is helical spring 32. The venting mechanism 24 allows air to enter reservoir 10. Thus, when cam 44 is depressed, washer 30 is disengaged from hole 28. When the downward force on cam 44 is removed, spring 32 raises cam 44, thereby engaging washer 30 against hole 28 and sealing the reservoir 10 from contamination by external particulants. The means for activating the venting mechanism will be discussed below.

Figure 2:
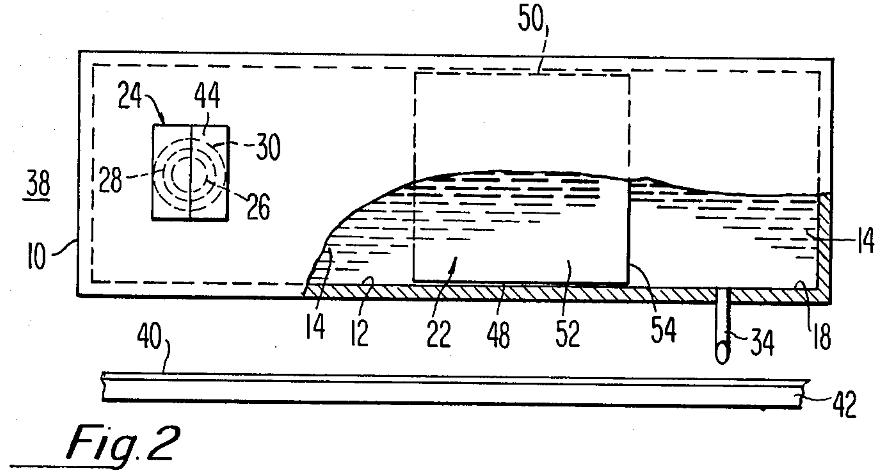
FIG. 2 is a top view of the cartridge of FIG. 1 with a section cut away.

Mounted perpendicularly to the front surface of reservoir 10 is ink jet nozzle 34. As shown in FIG. 2, the nozzle 34 is hollow so that ink 14 may pass from the second portion 18 of reservoir 10 and be dispensed through the tip of nozzle 34.

Cam 36 is mounted to the printer mechanism (not shown) and serves to depress cam 44 as will be explained below.

The ink jet cartridge 38 of the present invention is intended to be disposable. Thus, when the ink supply 14 is exhausted, the entire cartridge 38 (including the integral nozzle 34) are replaced by removing the old cartridge 38 and installing a new cartridge 38 in the print head mechanism (not shown). The cartridge 38 is intended for use in an electrostatic printiing mechanism utilizing on-demand printing techniques well known in the prior art. In such an environment, ink 14 is only dispensed from nozzle 34 when the nozzle 34 is pulsed with the appropriate voltage differential.

The printing mechanism which accommodates the cartridge 38 is of the type where the print head (including the integral cartridge 38) moves horizontally across the recording paper 40 (FIG. 2) one scan line at a time, and the ink jet 34 is activated only at points along the scan line where ink 14 is to be deposited on paper 40. After the cartridge 38 has scanned across a line, the recording paper 40 is moved vertically to position the next scan line on the paper 40 in front of the dispensing aperture of the nozzle 34.

Printing may occur as the cartridge 38 scans across the paper 40 in either or both directions. In the case where printing occurs in both directions, the paper 40 must be vertically advanced at the completion of each scan in either direction.

Mechanisms for advancing the paper 40 in front of the nozzle 34 are well known in the prior art. For example, the paper 40 may be mounted on a drum (not shown) which incrementally rotates at the completion of each scan line.

In the preferred embodiment, the paper 40 is positioned in front of a metallized surface 42 (FIG. 2). Those skilled in the art will appreciate the necessity of positioning the paper 40 in front of the metallized surface 42 in order to accomplish electrostatic ink jet printing.

Although not shown in the drawings, those skilled in the art will appreciate that a fixed potential or grounded control aperture may additionally be provided between the tip of ink jet 34 and the paper 40 in order to provide electrostatic shielding of the jet 34. The purpose of the control aperture is to eliminate the undesirable effects of triboelectric charging of the paper 40 and charges due to ink 14 already on the paper 40. In such case, it may be desirable to incorporate such a control aperture as part of the cartridge 38 itself, in which case it would also serve to protect the jet 34 from damage and the operator from injury from the pointed tip of the jet 34.

In the preferred embodiment, cam 36 is mounted on the printing mechanism (not shown) and is aligned with the cartridge 38 as shown in FIG. 1. Thus, when the head (and included cartridge 38) moves to the right, cam 44 comes into contact with the lower surface of fixed cam 36.

With the elements of the present invention thus defined, the operation of the present invention will now be explained with reference to FIGS. 1–2.

FIG. 1 shows the cartridge 34 after it has been primed (as will be explained below). In such a condition, the ink 11 in the second portion 18 of the reservoir 10 is at the second level 20, the second level 20 corresponding to the proper hydrostatic head pressure (and head height) to maintain a proper meniscus shape at the tip of the ink jet nozzle 34. The cartridge 38 is moved back and forth to the right and left by the printer head drive mechanism (not shown), and the jet 34 is pulsed at points along the travel where ink 14 is to be deposited on the paper 40. At the end of each head scan across the paper 40, the paper 40 is vertically repositioned to position the next scan line on the paper 40 in front of the jet 34.

In the preferred embodiment, the head height is the vertical distance between the level of ink 14 in the second portion 18 and the center of the diameter of the longitudinal channel of ink jet nozzle 34. In a typical application, a head height of 0.2–0.3 inch is required for a jet 34 inside diameter of 0.024 inch in order to achieve an optimum meniscus at the external tip of nozzle 34. In the preferred embodiment, the second level 20 corresponds to the optimum head height of ink 14. Those skilled in the art will appreciate that factors such as the physical characteristics of the ink 14 and the geometry of the nozzle 34 will affect the optimum head height and therefore influence the choice of the height of end wall 54 of ramp 22.

As the ink 14 in the second portion 18 is dispensed from nozzle 34, the level of ink 14 in the second portion 18 gradually decreases from the initial second level 20 shown in FIG. 1. However as the head changes its direction of horizontal motion after printing a line, inertial force causes the ink 14 in the first portion 12 to shift back and forth horizontally with respect to the reservoir 10. The inertia of the ink 14 is sufficient to move the ink 14 from the first portion 12 up inclined surface 52 and into the second portion 18. When this shifting of ink 14 occurs, the level of ink 14 in the second portion 18 may for an instant exceed the second level 20. However, ink 14 will immediately flow back into the first portion 12 until the ink head height in the second portion 18 is at the second level 20. Additional ink 14 flow back into the first portion 12 is blocked by the perpendicular end 54 of ramp member 22.

As a result of the latter discussed action, the head height of ink 14 to the jet nozzle 34 is restored to the second level 20 after printing each line. Since only a small quantity of ink 14 is dispensed in printing a single line and since the optimum head height of ink 14 is restored after printing each line, for all practical purposes the hydrostatic pressure to nozzle 34 is constantly maintained at its optimum value.

As the head (not shown) 38 moves to the right, the upper surface of cam 44 slidably contacts the lower surface of fixed external cam 36, thereby depressing cam 44. The downward force on cam 44 causes washer 30 to be disengaged from hole 28, thereby allowing air to enter the reservoir 10 and replace the quantity of ink 14 that was dispensed from nozzle 34 since the last venting action occurred. This venting is necessary to avoid creating a vacuum in reservoir 10 which would prevent the proper dispensing of ink 14 from nozzle 34.

External cam 36 is horizontally positioned so that it is fully engaged with cam 44 when the head (and included cartridge 38) is at its extreme right directional position; viz., when the head has moved to a position corresponding to printing the end of a scan line.

As the head changes direction and moves to the left, cam 44 is slidably disengaged from cam 36. As this disengagement occurs, spring 32 restores cam 44 to a raised position, which in turn raises washer 30 into contact with hole 28, thereby sealing the reservoir 10 from external contaminents.

In the preferred embodiment, when cam 44 is not engaged with cam 36, washer 30 serves to completely seal the reservoir 10. Depending on the physical characteristics of the jet nozzle 34 and the ink 14, improved printing performance may be achieved by providing continuous partial or full venting of the reservoir 10. Continuous partial venting may be achieved in many ways. For example, the venting mechanism 24 may be keyed so that when the cartridge 38 is installed in the print head, bolt 26 is partially depressed even when cam 44 is not engaged with cam 36. Alternatively, an additional relatively small vent which is always open may be provided in the reservoir 10.

Continuous full venting may be achieved by locating cam 36 on the print head itself such that when cartridge 38 is installed in the print head, cam 36 will continuously engage cam 44, thereby opening the vent. In such case, the cartridge 10 would always be fully vented when installed in the print head. However, when not installed in the print head, the cartridge 38 will be sealed to prevent the spilling of ink 14 and the introduction of contaminents into the reservoir 10.

Those skilled in the art will appreciate that instead of controlliing the cartridge 38 venting by the interaction of cams 36 and 44, a venting mechanism utilizing a solenoid to open and close the vent may be included in the cartridge 38 in place of venting mechanism 24.

Figure 3:
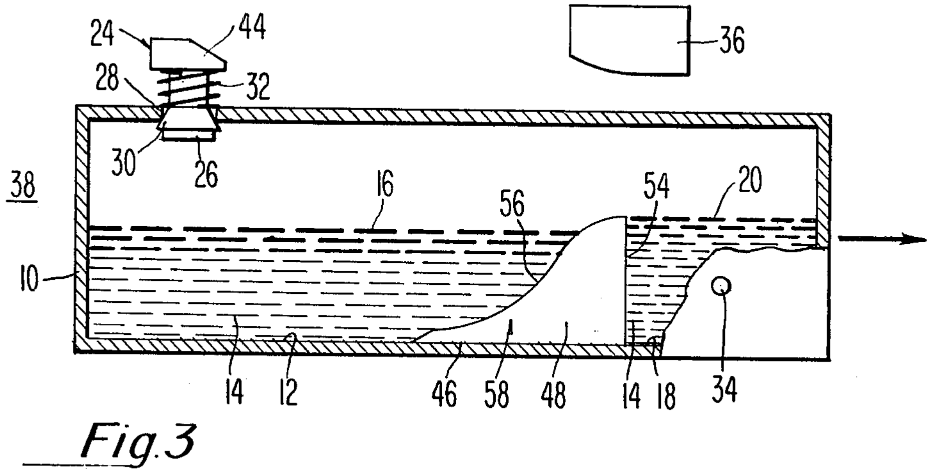
FIG. 3 is a front pictorial view of an alternate embodiment of the disposable ink jet cartridge, with a section cut away.

FIG. 3 shows an alterate embodiment of the present invention. The alternate embodiment is identical to the primary embodiment (FIGS. 1–2) except that the inclined surface 56 of ramp member 58 is curved rather than being flat. The curved shape of surface 56 may provide for a more uniform transfer of ink 14 from the first portion 12 to the second portion 18 depending on the viscosity of the ink 14 utilized. In other respects, the alternate embodiment operates in a manner identical with the primary embodiment.

Having shown and described the preferred embodiments of the present invention, those skilled in the art will realize that various omissions, substitutions and changes may be made without departing from the spirit of the invention.

Thus, those skilled in the art may appreciate that it may be desirable to vent the cartridge 34 at less frequent intervals. To accomplish this, cam 36 could be positioned further to the right and the vent mechanism 24 could be activated only when the print mechanism control (not shown) moved the head to the right a distance which exceeds the width of the recording paper 40.

Further, those skilled in the art will appreciate that the shape of ramp 22 could be changed so that end 54 is not perpendicular with the bottom of reservoir 10, or so that end 54 is not a flat surface.

Still further, those skilled in the art will appreciate that the cartridge 38 must be replaced when the supply of ink 14 in the first portion 12 reaches a level so low that it is not transferred to the second portion 18 in response to the transverse motion of the cartridge 38.

In addition, those skilled in the art will realize that variations may be made in the dimensions of the end 54 and base 46 of ramp member 22.

It is the intention, therefore, that the invention be limited only as indicated by the scope of the following claims.

What is claimed is:

1. An ink jet cartridge forming part of a head of a printer mechanism, said head mounted to move transversely back and forth across the width of a recording paper, said ink jet cartridge comprising:

an ink reservoir;

a quantity of ink contained therein;

ramp means, connected to said ink reservoir and including an inclined ramp, said ramp means for dividing said ink reservoir into first and second compartments;

an ink jet nozzle mounted on a wall of said second compartment; and wherein the ink in said first compartment flows over said ramp means and is trapped in said second compartment in response to said print head moving transversely back and forth across the width of said recording paper.

2. The ink jet cartridge in accordance with claim 1 wherein said ramp means is positioned inside said reservoir in contact with the front and back walls and the bottom of said reservoir.

3. The ink jet cartridge in accordance with claim 1 or 2 wherein said ramp means' structure provides an inclined surface starting at the bottom of said first compartment and continuing to points below the top of said reservoir, a second surface continuing from said later points downward until said second surface meets the bottom of said reservoir.

4. The ink jet cartridge in accordance with claim 3 wherein said second surface is perpendicular with the bottom of said reservoir.

5. The ink jet cartridge in accordance with claim 3 wherein said inclined surface rises linearly at an acute angle with respect to the bottom of said reservoir.

6. The ink jet cartridge in accordance with claim 3 wherein said inclined surface is curved.

7. The ink jet cartridge in accordance with claim 3 wherein the oriface of said ink jet nozzle passes through the wall of said reservoir to which it is mounted.

8. The ink jet cartridge in accordance with claim 1 further including venting means, connected to the top of said reservoir, said venting means responsive to engagement with an external camming means as said print head moves across said paper in one direction, said venting means for admitting air into said ink reservoir to replace ink that has been dispensed from said nozzle.

9. The ink jet cartridge in accordance with claim 3 wherein the height of said second surface with respect to the bottom of said reservoir corresponds to an ink head height providing optimum hydrostatic pressure to said jet nozzle.

10. The ink jet cartridge in accordance with claim 8 wherein said venting means includes:

a rod passing through a hole in the top of said reservoir;

a washer held in place on the bottom of said rod;

a cam connected to the top of said rod; and a helical spring positioned around said rod between the top surface of said reservoir and said cam.

11. The ink jet cartridge in accordance with claim 3 wherein said inclined surface and said second surface are not perpendicular with each other.

12. The ink jet cartridge in accordance with claim 3 wherein said second surface is not plane.

13. An ink jet cartridge forming part of a head of a printer mechanism, said head mounted to move transversely back and forth across the width of a recording paper, said ink jet cartridge comprising:

an ink reservoir;

a quantity of ink contained therein;

ramp means, connected to said ink reservoir, said ramp means for dividing said ink reservoir into first and second compartments, said ramp means' structure providing an inclined surface starting at the bottom of said first compartment and continuing to points below the top of said reservoir, a second surface continuing from said later points downward until said second surface meets the bottom of said reservoir;

an ink jet nozzle mounted on a wall of said second compartment; and wherein the ink in said first compartment flows over said ramp means and is trapped in said second compartment in response to said print head moving transversely back and forth across the width of said recording paper.

14. An ink jet cartridge forming part of a head of a printer mechanism, said head mounted to move transversely back and forth across the width of a recording paper, said ink jet cartridge comprising:

an ink reservoir;

a quantity of ink contained therein;

ramp means, connected to said ink reservoir, said ramp means for dividing said ink reservoir into first and second compartments;

an ink jet nozzle mounted on a wall of said second compartment;

venting means, connected to the top of said reservoir, said venting means responsive to engagement with an external camming means as said print head moves across said paper in one direction, said venting means for admitting air into said ink reservoir to replace ink that has been dispensed from said nozzle; and wherein the ink in said first compartment flows over said ramp means and is trapped in said second compartment in response to said print head moving transversely back and forth across the width of said recording paper.

15. The ink jet cartridge in accordance with claim 13 wherein said second surface is perpendicular with the bottom of said reservoir.

16. The ink jet cartridge in accordance with claim 13 wherein said inclined surface rises linearly at an acute angle with respect to the bottom of said reservoir.

17. The ink jet cartridge in accordance with claim 13 wherein said inclined surface is curved.

18. The ink jet cartridge in accordance with claim 13 wherein the height of said second surface with respect to the bottom of said reservoir corresponds to an ink head height providing optimum hydrostatic pressure to said jet nozzle.

19. The ink jet cartridge in accordance with claim 13 wherein said inclined surface and said second surface are not perpendicular with each other.

20. The ink jet cartridge in accordance with claim 13 wherein said second surface is not plane.

* * * * *